Patented Nov. 29, 1932

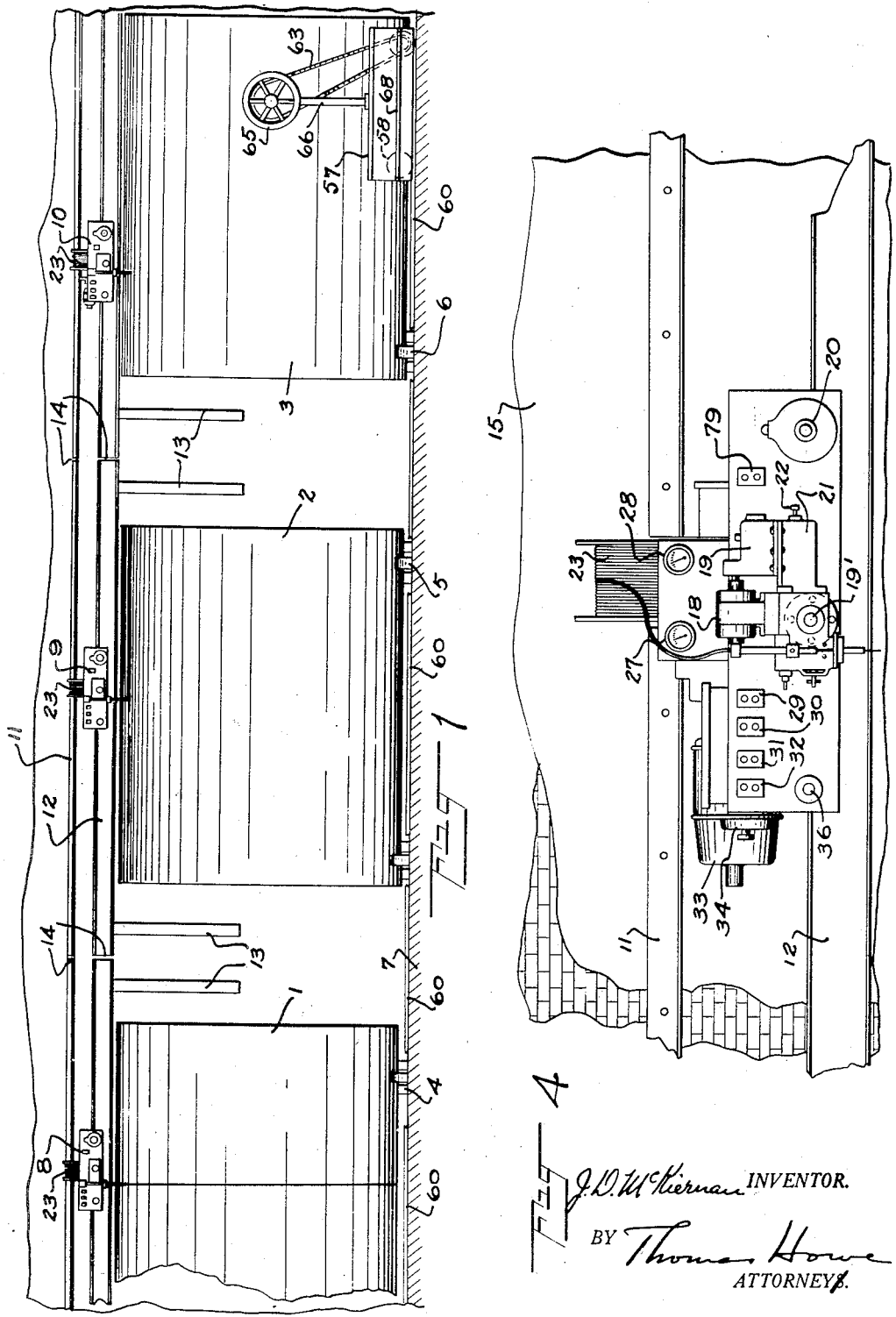

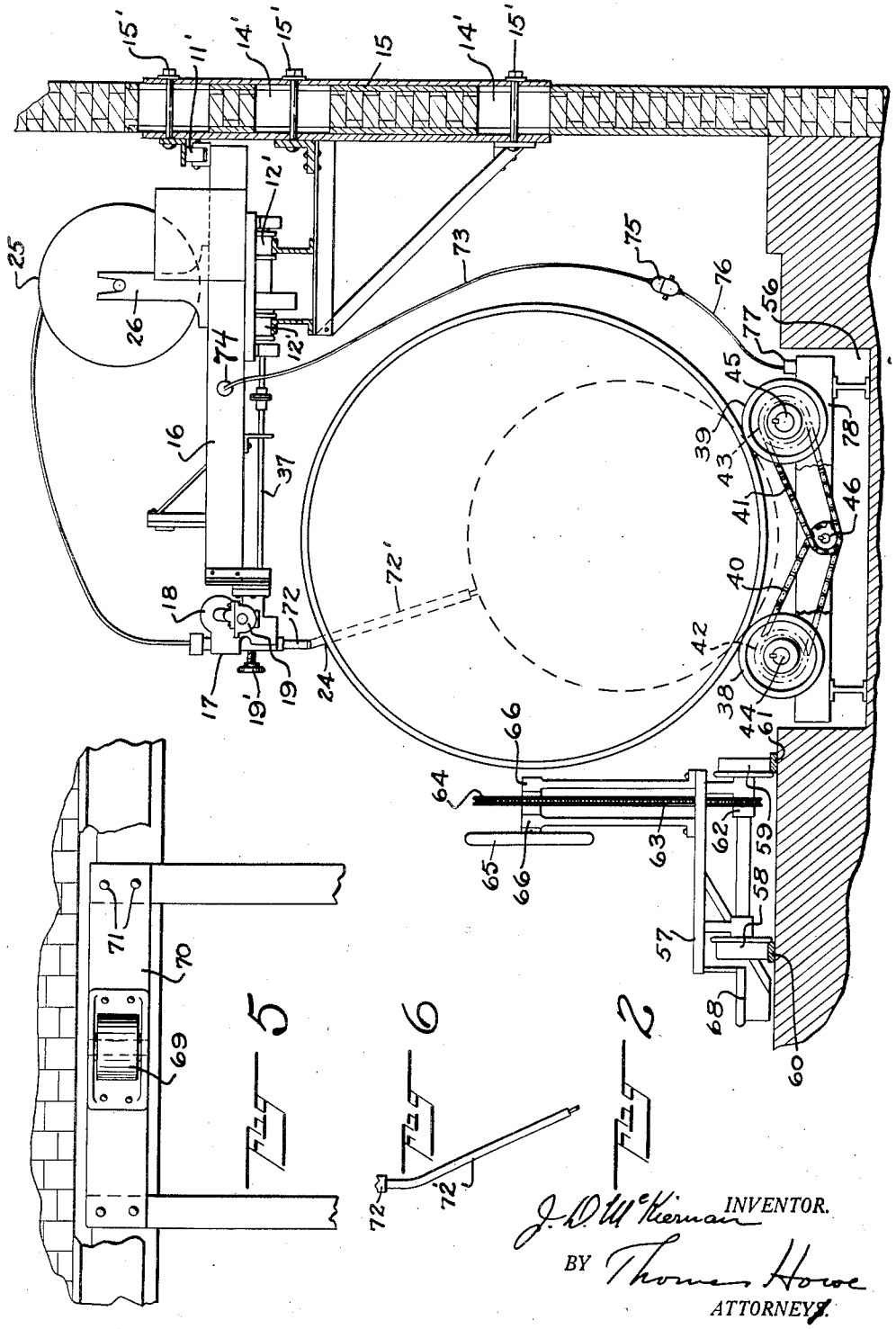

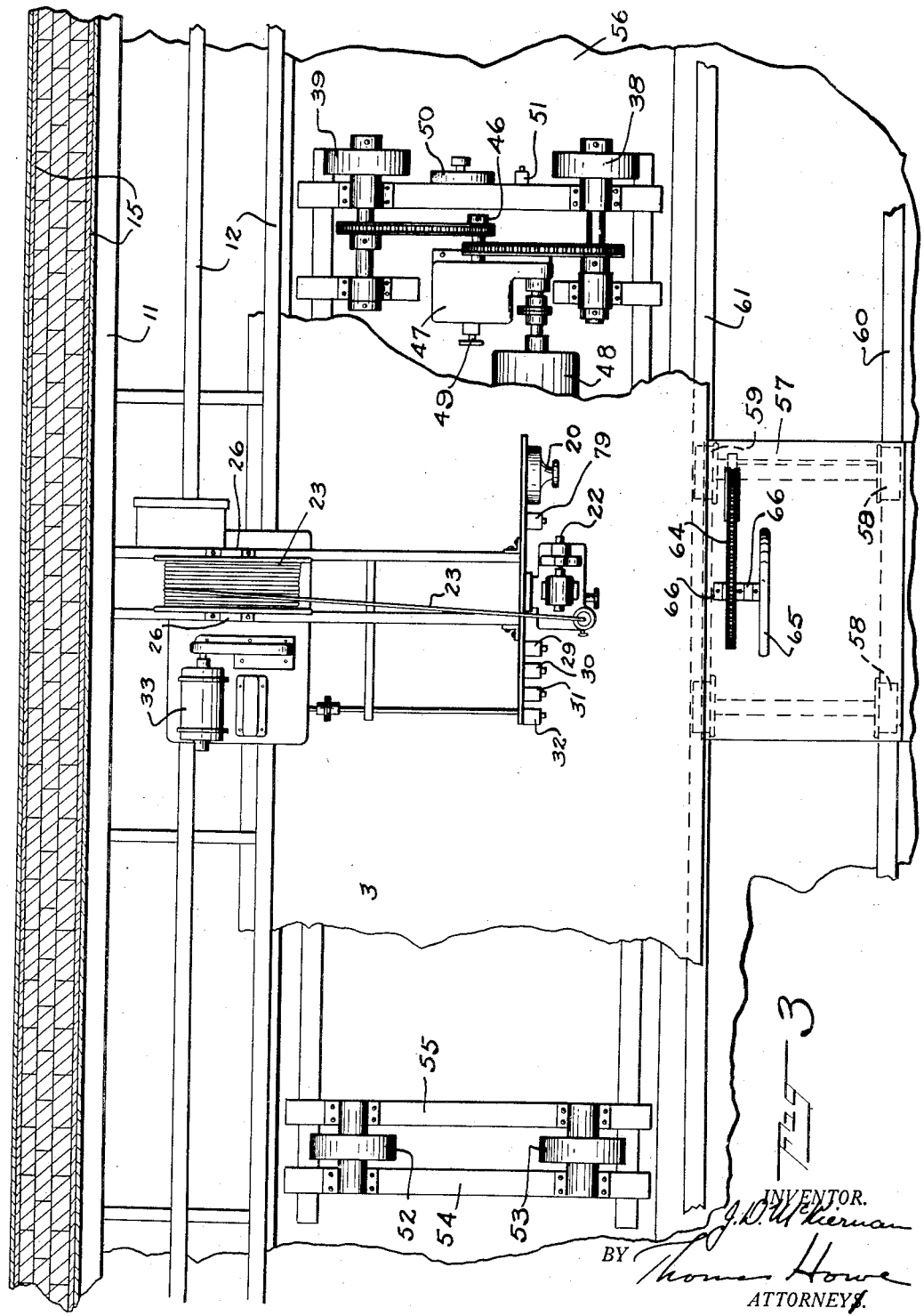

1,889,319

UNITED STATES PATENT OFFICE

JAMES D. McKIERNAN, OF BROOKLYN, NEW YORK, ASSIGNOR TO EARL C. MAXWELL CO., INC., A CORPORATION OF NEW YORK

WELDING MACHINE

Application filed April 21, 1927. Serial No. 185,377.

This invention relates to welding machines of the automatic and semi-automatic type. It has for its object the simplification and improvement of operation of present welding machines.

More particularly this invention relates to the use of machines which are designed for the purpose of welding cylindrical metal tubing or pipe and is adapted more particularly for use with electrical welding apparatus.

It is well known that welding may be accomplished automatically if the apparatus is properly adjusted so that the seams to be welded will travel along at the proper speed with relation to the welding machine, the feeding of the welding material being adjusted to correspond with this speed. In order to do this it is usually necessary that the welding apparatus be positioned over the work so that the molten welding material from the welding rod will drip onto it with a minimum of loss. Also owing to the fact that it is desirable to weld large sized articles it is obviously necessary to have it vertically adjustable to accommodate different sized articles. Often times difficulties have been encountered owing to the fact that tubes and cylindrical members desired to be welded are bulky and not easily handled and therefore are not easily placed in position beneath the welder. This invention has for its object the provision of an arrangement whereby the members to be welded may easily be handled and placed in operative position, and the welding apparatus then moved over the members in proper relation to weld the seam both longitudinally and circumferentially of the member and to permit the control of the apparatus from one location.

With these movements between the welding apparatus and the member to be welded provision is made for a combination of the two in such a way as to permit the welding of any type of seam which it is desired to weld. This invention, therefore, has for its object to provide an apparatus in which both transverse and longitudinal seams may be welded automatically or semi-automatically by such welding apparatus and to accomplish these results with as little difficulty as possible in connection with the movement of the tubing or other material, into and out of operative relation with the welding apparatus.

Another object of this invention is to provide welding apparatus mounted upon a movable member such that it may be movable over a length of track and into operative relation to any of a series of cylindrical members or other devices desired to be welded.

Another object is to provide a plurality of welding apparatuses which are readily movable into and out of operative relation to the member to be welded so that in case one of the apparatuses which is arranged for welding becomes inoperative, it may be readily replaced by moving another of such members into relation therewith.

Another object is to provide a mounting for a plurality of welding apparatuses which are movable to the same location and yet may be moved into separate locations to weld the seam of pipe or tubing or other materials which happens to be in a particular place within the range of the mounting.

Another object of this invention is to provide a mounting for a plurality of welding apparatuses which are movable to the same location and yet may be moved into separate locations to weld the seam of pipe or tubing or other materials which happens to be in a particular place within the range of the mounting.

Another object of this invention is to provide a carrier system beneath a welding apparatus which is adapted to be located in welding relation to any one of a plurality of such carriers. Such an arrangement will permit the placing of the work upon one support at the same time that it is being welded upon another one. This type of arrangement permits the most efficient method of operation inasmuch as the operator can be welding one seam while the material including the pipe or tubing may be placed upon another support by other operators at the same time. Such an arrangement will permit the use of a skilled welder to operate the welding machine and less skilled helpers to place the material to be welded upon the supports while the welding operation is taking place.

Another object of this invention is to provide an automatic welding arrangement which has adjustable means for controlling the feed of the welding rod, adjustable means for controlling the speed of motion of the welding apparatus with relation to the seam to be welded longitudinally in one direction and a third means of control for governing the speed of the seam to be welded with relation to the welding machine in a line perpendicular to the longitudinal motion.

A still further object of this invention is to provide a movable stand which is adapted to be moved into and out of relation with any of a plurality of supports for supporting material to be welded. Such an arrangement is conducive to easy handling of the material to be welded and permits of efficiency and time saving in connection with its adjustment and operation.

Another object is to provide automatic welding apparatus that is capable of both longitudinal and perpendicular welding which may be readily adjustable in a vertical direction to accommodate different sized articles.

Further and more definite objects will be seen in connection with the following specifications, claims and drawings in which—

Figure 1 represents a general front view of my arrangement showing a plurality of welding apparatuses in working relation to the materials to be welded;

Figure 2 shows a side view of my arrangement partly in section to show the method of operation;

Figure 3 shows a top view of my arrangement with some of the parts broken away so as to show some of the mechanism;

Figure 4 shows an enlarged detailed view of the control board and the relation of the various parts mounted thereon;

Figure 5 shows a detail of the support for the welding apparatus with a part broken away to show the friction eliminating idler roll; and Figure 6 shows a detail of the welding terminal.

1, 2 and 3 as shown in Figure 1 represent pipes, tubings or other materials of the same nature which it is desired to weld, mounted upon the supports 4, 5 and 6 in such a way as to permit free rotation with respect to the floor structure 7. The welding devices 8, 9 and 10 are arranged in operative relation to the work materials 1, 2 and 3 and are also movable on tracks 11 and 12 in a longitudinal direction by means of wheels 11' and 12'. Tracks 11 and 12 are broken into sections by the joints 14 to permit independent vertical adjustment if desired. These tracks are mounted upon the vertically adjustable brackets 13.

These brackets are adjustably mounted upon the wall structure 15 or other similar supporting arrangement. Vertical adjustment is permitted in the slots 14' by loosening the nuts 15'. The carriage 16 is in the form of a rigid channel or similar supporting structure and carries at its end the automatic welding apparatus 17 together with its feed motor 18, speed control arrangement 19 and horizontally adjusting handle 19'. There is also provided a rheostat 20 shown in Fig. 4, for controlling the field current of the motor 18 which is mounted alongside the gear shift arrangement 19 with its speed control member 21.

By controlling the speed of this motor and its appertaining devices the welding speed of the welding rod 23 may be controlled, thereby controlling the voltage across the arc and the amount of deposit at the weld 24 thereby. This welding rod is mounted upon the reel 25 positioned on trunnions 26 mounted upon the supporting member of the carriage 16 as is shown in Figure 2.

Also mounted upon the control board as shown in Figure 4 are the meters 27 and 28 for aiding in the control and observing the amount of current used in the welding operation. The switches 29, 30 and 31 control respectively, the forward reverse action, the hand or automatic action, the running or the stopping of motor 33 and its gear box 34 for controlling the longitudinal motion of the carriage along the tracks 11 and 12. This motor is geared through suitable gears, not shown. The switch 32 controls the turning on or shutting off of the welding current supplied to the welding rods as well as to stop or start the feed motor for the welding rod 23. The hand-automatic control 30 couples the circuits of the feed rod motor and the carriage so that they both may be controlled by switch 32.

The travel of the carriage member along the tracks 11 and 12 is still further controlled by the carriage drive pin 36 connected to extension 37 for disengaging the carriage drive gears from their connection with wheels 12' in a well known manner. This permits an instantaneous stop whereas the operation of the switch 31 would require the motor to lose its momentum slowly and come to a stop with some delay.

For rotatably supporting the work or tubing 3 there are provided rollers 38 and 39 in Fig. 2 geared together by means of chains 40 and 41 surrounding the sprockets 42 and 43 respectively, and keyed to the shafts 44 and 45. These chains are also connected over the drive sprockets 46 which are directly connected to the gear box 47 in Fig. 3 having motor 48 as a driving means therefor. Any one of a plurality of gears within the box 47 may be connected with the motor 48 by means of the gear shift pin 49, in a well known manner, so that the relation of the speed between the motor 48 and the driver 46 may be changed at will. In addition to this the rheostat 50 may be used to control the speed of the motor 48 still further in order that different speeds may be imparted to the drivers 38 and 39 associated therewith.

The starting and stopping buttons 51 are arranged to open or close circuits to the motor 48 as desired.

Additional rollers 52 and 53 are adjustably arranged to support the other end of the tubing or cylinder 3. These rollers may be moved on their supporting channels 54 and 55 in a longitudinal direction with respect to the tracks 11 and 12. The work supporting rolls 38 and 39 may be inserted in a depression 56 in the floor structure, so as to be out of the way as much as possible and to permit the work to be mounted thereon with as little lifting effort as possible.

In front of the work support is arranged a movable platform 57 shown in Figs. 2 and 3 which is mounted upon the wheels 58 and 59 arranged to cooperate with the tracks 60 and 61. These wheels may be operated through the action of the sprocket 62 and the chain 63 movable by means of the sprocket 64 coupled directly to the hand wheel 65. This hand-wheel is mounted upon trunnions 66 which are supported by the platform 57. Suitable steps or a ladder arrangement 68 may be used for facilitating the access to the platform 57. These tracks 60 and 61 may be mounted parallel to and longitudinal with the tracks 11 and 12 so that the proper spaced relation may be maintained with the platform 57 and work 3.

It is obvious that a person standing on the platform 57 will be in proper relation to operate the handwheel 65 to move the platform 57 to any place convenient with relation to the work 3 and also be in position to operate the controls on the control panel as shown in Fig. 4 to control the complete operation of the welding apparatus without constantly changing his position and thereby necessitating the stopping and starting of the machine which would be detrimental to the weld and cause undesirable unevennesses.

The track 11 is arranged to cooperate with an idler roll as shown in Fig. 5 which is rotatably mounted at 69 on the supported end of the channel carriage beams 16. This roller is shown more clearly in Fig. 2 and is mounted upon a cross member 70 rigidly attached by rivets or bolts 71 to the carriage 16. It can thus be seen that any force or weight which attempts to lower the outer end of the support 16 will act as a lever with track 12 as a fulcrum to attempt to raise roll 69 against the track 11. Obviously the track 11 will prevent this movement and the apparatus will be maintained securely on the supporting structure.

The operation of the apparatus may be considered in connection with Fig. 1. Here it is apparent that the tubes or cylinders 1, 2 and 3 may readily be removed from their rotating rolls by shifting the welding machines along the tracks 11 and 12 so as to be in such a position as not to interfere with the cylinders when they are being lifted from their rotating rolls.

The machines would be placed in a position between the rolls and perhaps over one of the brackets 13. In this position they would not be in the way of the cylinders when they were lifted in a perpendicular direction. In addition to this, it can also be seen that if one of the welding machines 8, 9 or 10 happens to be inoperative or broken another of the machines may be readily moved to the operative position and the inoperative one may be moved to one side out of the way.

Where only two work supporting platforms are used a single welding machine may be sufficient for taking care of all the work. The platform 57 and the welding machine 10 might be placed in operative relation to the welding cylinder 3. The welding machine 9 would then be moved to one side so as to allow the removal of cylinder 2, while the cylinder 3 was being welded by the welding machine 10.

As soon as the cylinder 3 was completely welded and all the operations performed on it that are necessary, another cylinder would be placed in the location of cylinder 2 upon the supports 5. Then the welding apparatus 10 could be shifted over the new location at 2 permitting the removal of cylinder 3 and the placing of a new cylinder at 6. This can be done simultaneously with the welding of the cylinder at 2 which is placed upon the supporting roll 5 without loss of time and through the employment of but a single skilled welding machine operator and one or two helpers who may replace the work upon the stand not being used in a welding operation. In this way continual operation of the welding machine is permitted and no loss of time of either the welder or his helpers results.

Any size cylinder 3 may be used and supported by the rolls 38 and 39. When a smaller roll 3 is used then it will take the position as indicated by the dotted line and the welding terminal 24 may be withdrawn from its support by means of the rigid extension tube 72' (Fig. 6) and placed in operative relation to the smaller size cylinder. This tube may be inserted in the place of tube 72. Also the height of the welding terminal may be more closely adjusted by sliding the tracks 11 and 12 along the slots 14'.

In order to facilitate the operation and adjustment of the various devices from a central point and permit a man standing on the platform 57 to operate all of the apparatus without changing his position unnecessarily, a connection cord 73 is provided attached to the carriage members 16 at 74. This connection cord is provided with a readily detachable connector 75 for connecting to another connection cord 76 which is secured at 77 to the roller support 78. These cord connections are provided for the operating circuits controlling the rotating motors for the rollers 38 and 39 so that they may be governed and controlled from a position taken by a man standing on platform 57 to control a switch or other actuating devices attached to the switch board described and shown in Figure 4. This switch is shown at 79 and governs the rotation of the rolls 38 and 39 in either a clockwise or counter-clockwise direction.

The purpose of the separable connector 75 is to permit the use of any of the welding apparatuses 8, 9 or 10 in connection with the supports 4, 5 or 6 so that the welding machine may be used on work which happens to be supported by any one of the welding supports without causing an unnecessary amount of loss of time in making the proper connections. Obviously instead of using a separable connection 75 with flexible cords a plurality of bare conductors could be supported upon, or adjacent to, the tracks 11 or 12, and brushes or contact wheels could be made to contact therewith in order to complete the proper circuit. They would preferably terminate at the end of each support. These conductors could then be directly connected to the motors used for rotating the rolls 38 and 39 and there would therefore be no necessity of making separate connections to each work support in case the welding apparatus were moved to or away from it.

No attempt has been made to explain and disclose all of the operating details of the gear shifts, circuits and other devices for controlling and varying the speed of the various speed controls. It is believed that this description is unnecessary and that these different controls are well understood in the art and that therefore a detailed description of them is unnecessary and would only serve to render the description more complicated. It can therefore be seen that the present invention relates to the proper arranging of the different apparatuses and controls of the welding device so as to complete with an automatic welder both the longitudinal and the circumferential seams of a tank, without changing the location of the tank.

It also can be seen that the method of supporting the cylinders and the apparatus itself is such as to render the removal of the cylinders more easily accomplished inasmuch as it is only necessary to move the welding apparatus beyond the end of the cylinders, at which position it will be out of the way and will permit the cylinders to be lifted directly from the supporting rolls 38 and 39 by means of an overhead crane or other lifting apparatus.

A circular seam on the cylinder may be welded by rotating the rolls 38 and 39. A perpendicular seam, or seams which are parallel to the axis of the cylinders also may be welded without removing the cylinder by the movement of the welding apparatus along the tracks 11 and 12.

As the welding apparatus is moved along the tracks the platform 57 on which the operator stands may be readily movable by rotating the hand-wheel 65 so as to keep the operator in operating relation to the welding apparatus. Obviously the platform might be connected to the carriers 16 and move automatically therewith.

The two movements may be performed at the same time if desired and an irregular seam may be welded by the combination of both of them. If the speed of either are controlled properly a spiral seam may be welded which would permit the formation of a continuous cylinder or tube from a strip of sheet material of definite width. Also a plurality of cylinders may be positioned upon the supporting rolls 4, 5, and 6 and may all be welded together at substantially the same time and during the rotation of all of the rolls simultaneously. In this case there might be a plurality of platforms 57 and operators positioned in front of each of the machines 8, 9 and 10.

With the arrangement of the supporting rolls, a tube of practically unlimited length may be welded whereas with previous devices a tube of only a limited length may be welded. If it is desired to weld a cylinder of greater length than usual it may be supported upon any one of the rotatable supports 4, 5 and 6, and may project out beyond and be supported by some of the others without necessity of special apparatus.

As previously described a longitudinal seam, or one parallel with the axis of the cylinder, may be welded throughout its entire length in a single operation by the movement of one machine throughout the length of the tracks 11 and 12. Any number of circumferential welds may be performed without removing the cylinder from the support or changing its operative relation to the welding apparatus. The only difference between the use of the apparatus in welding a circumferential seam and a seam which is parallel or longitudinal to the axis of the cylinder is that in a circumferential weld, the rollers 38 and 39 are revolved and the carriage 16 is held stationary upon the tracks 11 and 12, while in the longitudinal weld the rollers 38 and 39 are held stationary while the machine is moved throughout the length of the tracks 11 and 12. Heretofore it has been impossible to perform both these operations in the same machine without removing the cylinder from one machine and placing it in another. The present apparatus also permits its removal by a direct upward lift without interfering in any way with the other parts of the welding apparatus.

It is not intended that this invention be limited to the exact construction and modification shown but any change which is within the scope or range of equivalents indicated in the following claims might be used.

What I claim is:

1. In a welding machine, a longitudinal track, devices movable upon said track including welding apparatuses having depending welding terminals, a plurality of aligned work supports arranged at a lower level than said apparatus and having rotational elements, means for moving said devices along said track, means for feeding a welding rod through said terminal, means for causing a difference of electrical potential between said rod and said work supports conjointly with the feeding thereof, and means for rotating said elements of the work supports and a control board mounted on each of said devices having arrangements for adjusting the actuation of all of said means individually.

2. In a welding machine, a longitudinal track, devices movable upon said track including welding apparatuses having depending welding terminals, a plurality of aligned work supports arranged at a lower level than said apparatus and provided with revoluble supporting members, means for moving said devices along said track, means for feeding a welding rod through said terminals, means for causing a difference of electrical potential between said rod and said work supports conjointly with the feeding thereof, and means for rotating said revoluble supporting members of the work supports and a control board mounted on each of said devices having arrangements for adjusting the actuation of all of said means individually and connections for interchangeably controllably associating any of said control boards with any of said work supports.

3. In a welding machine, a longitudinal track, devices movable upon said track including welding apparatuses having depending welding terminals, a plurality of aligned work supports arranged at a lower level than said apparatus and provided with revoluble supporting members, means for moving said devices along said track, means for feeding a welding rod through said terminal, means for causing a difference of electrical potential between said rod and said work supports conjointly with the feeding thereof, and means for rotating said revoluble supporting members of the work supports and a control board mounted on each of said devices having arrangements for adjusting the actuation of all of said means individually and connections for interchangeably controllably associating any of said control boards with any of said revoluble members and a working platform movable on another track longitudinally of said first track.

4. In a welding machine, the combination with a longitudinal track, of welding apparatus movable along said track and having a depending welding terminal, a work support arranged at a lower level than said apparatus and having rotational elements, means for rotating said elements, means for causing a difference of electrical potential between said terminal and the work and means mounted on said apparatus for controlling said work support element rotating means.

5. In a welding machine, a longitudinal track, devices movable upon said track including welding apparatus having depending welding terminals, a plurality of aligned work supports arranged at a lower level than said apparatus and having rotational elements, means for moving said devices along said track, means for feeding a welding rod through the said terminal, means for causing a difference of electrical potential between said rod and said work supports conjointly with the feeding thereof, means for rotating said elements of the work supports and a control board mounted on each of said devices having arrangements for adjusting the actuation of said rotational elements.

In testimony whereof I have signed this specification this 11th day of April, 1927.

JAMES D. McKIERNAN.